(12) United States Patent
Henry et al.

(10) Patent No.: US 9,850,974 B1
(45) Date of Patent: Dec. 26, 2017

(54) BUCKLING COLUMN LOAD SWITCH SPRING

(71) Applicant: HRL LABORATORIES, LLC, Malibu, CA (US)

(72) Inventors: Christopher P. Henry, Thousand Oaks, CA (US); Jie Jiang, Sherman Oaks, CA (US); Sloan P. Smith, Calabasas, CA (US); Jacob Mikulsky, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/199,878

(22) Filed: Mar. 6, 2014

Related U.S. Application Data

(60) Provisional application No. 61/783,499, filed on Mar. 14, 2013.

(51) Int. Cl.
| | |
|---|---|
| *F16F 7/12* | (2006.01) |
| *F16F 7/00* | (2006.01) |
| *F16F 13/00* | (2006.01) |
| *F16F 5/00* | (2006.01) |

(52) U.S. Cl.
CPC ............ *F16F 7/00* (2013.01); *F16F 7/125* (2013.01); *F16F 13/00* (2013.01)

(58) Field of Classification Search
CPC .......... F16F 7/104; F16F 15/00; F16F 15/022; F16F 15/04; F16F 15/06; F16F 15/067; F16F 15/073; F16F 7/00; F16F 7/125; F16F 13/00; H01H 1/24; H01H 1/242; H01H 2235/014
See application file for complete search history.

(56) References Cited

U.S. PATENT DOCUMENTS

| | | | |
|---|---|---|---|
| 3,281,166 A | 10/1966 | Doughty, Jr. et al. | |
| 3,699,296 A * | 10/1972 | Harris | 200/453 |
| 4,118,611 A | 10/1978 | Harris | |
| 4,243,838 A | 1/1981 | Coffey | |
| 4,740,057 A * | 4/1988 | Dezso | 359/819 |
| 5,409,200 A | 4/1995 | Zingher et al. | |
| 7,568,565 B2 * | 8/2009 | McFarland et al. | 188/380 |
| 8,181,944 B2 * | 5/2012 | Brewster | 267/136 |

FOREIGN PATENT DOCUMENTS

JP 2009168062 A * 7/2009

* cited by examiner

*Primary Examiner* — Melody Burch
(74) *Attorney, Agent, or Firm* — Lewis Roca Rothgerber Christie LLP

(57) ABSTRACT

A nonlinear mechanical element including a buckling column and hard stops. In one embodiment when the nonlinear mechanical element is subjected to an increasing compressive load, the buckling column buckles at a critical load, resulting in reduced stiffness past the critical load. One or more lateral hard stops may be provided adjacent to the buckling column to prevent the buckling deformation from exceeding a certain extent, and axial hard stops may be provided to shift the load path away from the buckling column when a certain amount of compressive displacement has been reached.

4 Claims, 15 Drawing Sheets

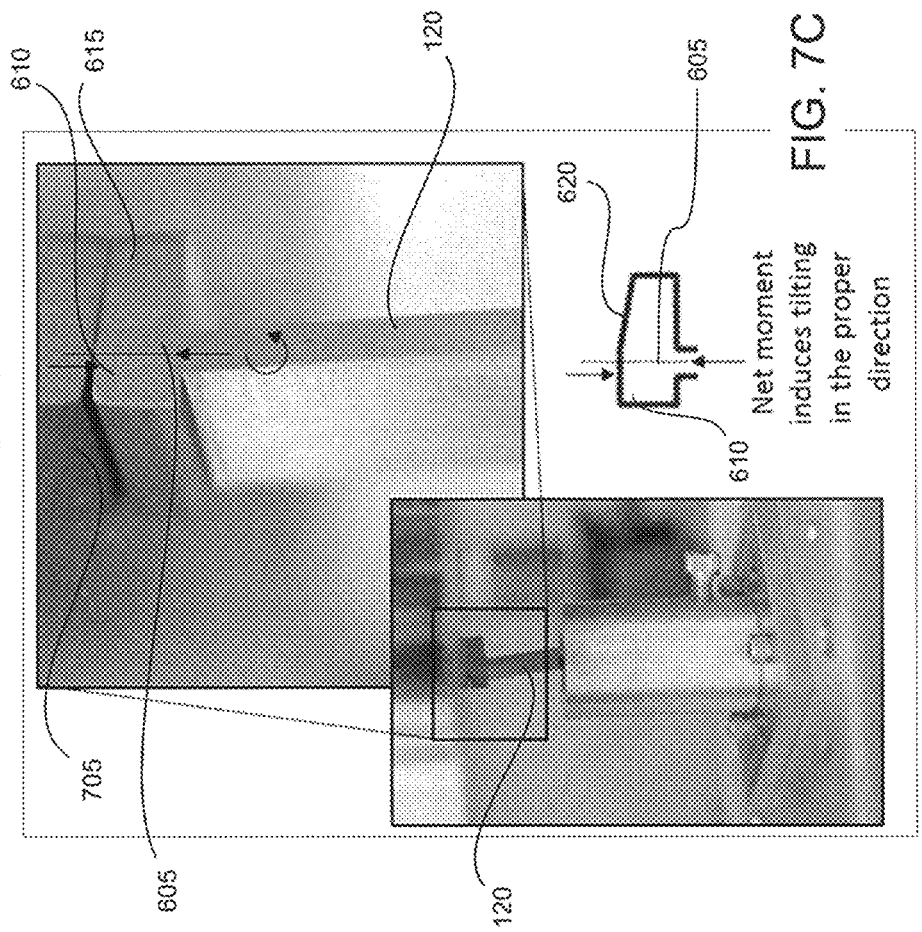

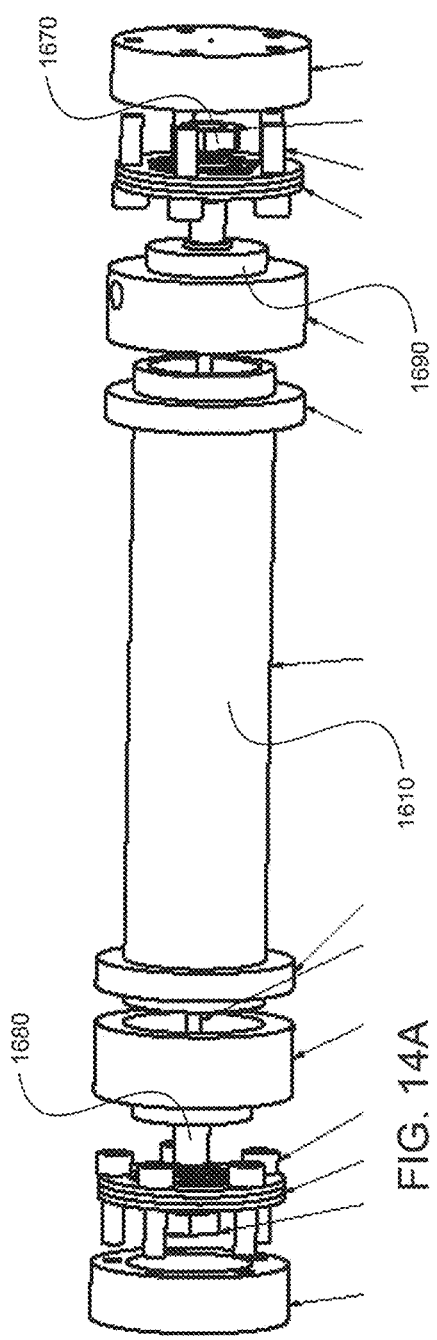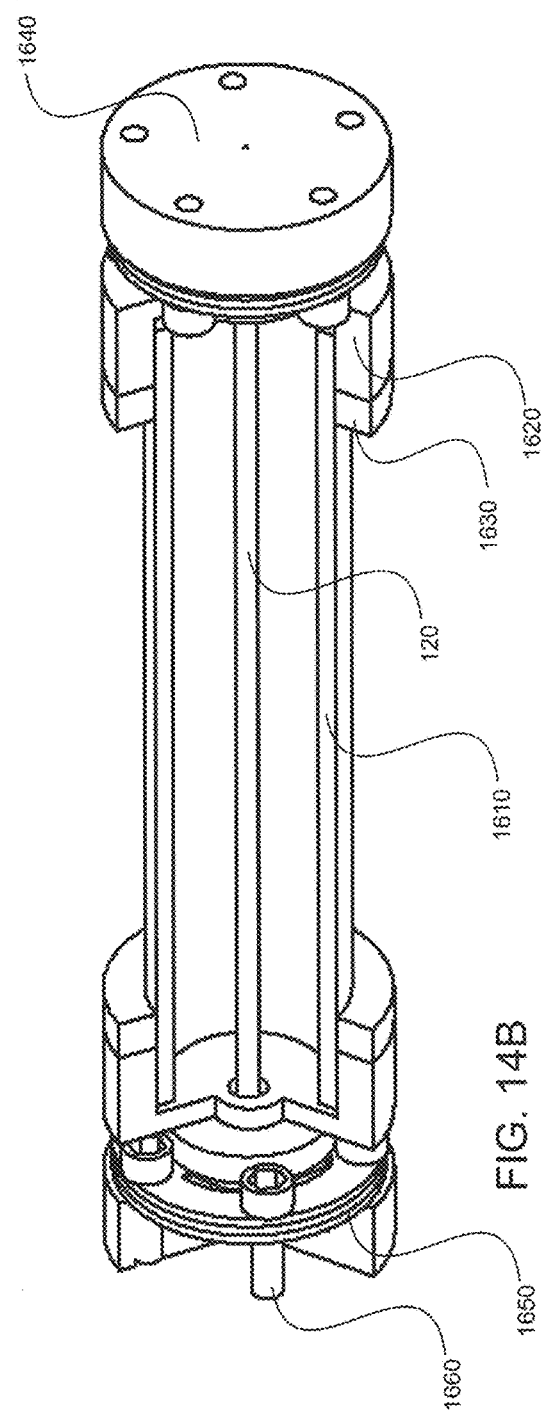

BUCKLING COLUMN LOAD SWITCH SPRING

CROSS-REFERENCE TO RELATED APPLICATIONS

The present application claims priority to and the benefit of Provisional Application No. 61/783,499, filed Mar. 14, 2013, entitled "BUCKLING COLUMN LOAD SWITCH SPRING", the entire content of which is incorporated herein by reference.

STATEMENT REGARDING FEDERALLY SPONSORED RESEARCH OR DEVELOPMENT

This invention was made with U.S. Government support under Contract No. HR0011-10-C-0125 awarded by the Defense Advanced Research Projects Agency (DARPA) Defense Sciences Office. The U.S. Government has certain rights to this invention.

FIELD

The present invention relates to nonlinear mechanical elements and more particularly to buckling elements exhibiting stiffness depending on load and displacement.

BACKGROUND

Mechanical elements with nonlinear mechanical impedance have a variety of applications. Crushable materials, for example, or crush zones in vehicles, provide protection from shock or impact, i.e., large loads of short duration. Such materials or structures absorb mechanical energy and are permanently deformed, i.e., damaged. As a result, such a material or structure may not provide protection from repeated impacts.

In some applications, large loads may occur repeatedly, as, for example, if the hull of a boat on rough seas repeatedly impacts the faces of large waves. In such circumstances it may be desirable, for example, to protect cargo on the boat from the shock of these impacts. Thus, there is a need for a nonlinear mechanical element which deforms without damage when subjected to a threshold load, and returns to an un-deformed state after the load is removed.

SUMMARY

In one embodiment when a nonlinear mechanical element including a buckling column is subjected to an increasing compressive load, the buckling column buckles at a critical load, resulting in reduced stiffness past the critical load. One or more lateral hard stops may be provided adjacent to the buckling column to prevent the buckling deformation from exceeding a certain extent, and axial hard stops may be provided to shift the load path away from the buckling column when a certain amount of compressive displacement has been reached.

According to an embodiment of the present invention there is provided a nonlinear mechanical element, including: a first column; a first hard stop; the first column being configured to buckle when a first compressive force transmitted through the first column exceeds a first threshold force; and the first hard stop being configured to prevent the first column from buckling beyond its elastic limit.

In one embodiment, the first hard stop is a lateral hard stop.

In one embodiment, the first hard stop is an axial hard stop.

In one embodiment, the nonlinear mechanical element includes a second hard stop, wherein the first hard stop is a lateral hard stop and the second hard stop is an axial hard stop.

In one embodiment, the nonlinear mechanical element includes a second column and a second hard stop, wherein the nonlinear mechanical element is configured to transmit substantially no force through the second column when the first compressive force is less than the first threshold force; the second column is configured to buckle when a second compressive force transmitted through the second column exceeds a second threshold force; and the second hard stop is configured to prevent the second column from buckling beyond its elastic limit.

In one embodiment, the nonlinear mechanical element includes a tilting mechanism coupled to one end of the first column.

In one embodiment, the tilting mechanism includes an eccentric rocking member.

In one embodiment, the nonlinear mechanical element includes a rotational stop.

In one embodiment, the rotational stop includes an angled surface on the eccentric rocking member.

In one embodiment, the tilting mechanism includes a dual load path element, wherein the dual load path element includes two load bearing members, each of the load bearing members being offset from the centerline of the first column, wherein one of the load bearing members is a monostable mechanical element.

In one embodiment, the monostable element is a domed monostable element.

In one embodiment, the tilting mechanism includes a fork secured to a rod.

In one embodiment, the nonlinear mechanical element includes a plurality of nonlinear elements.

According to an embodiment of the present invention there is provided a nonlinear mechanical assembly including: a housing; a column extending out of the housing; an end plate; the housing including a cylindrical portion; and the column being configured to buckle when a compressive force transmitted from the end plate and through the column exceeds a threshold force.

In one embodiment, the cylindrical portion is configured to operate as a lateral hard stop.

In one embodiment, the column includes a nub, and the end plate includes an indentation, and wherein the nub in the column engages the indentation in the end plate to register the column to the end plate.

In one embodiment, the nonlinear mechanical element includes a spring.

In one embodiment, the spring is an ortho-planar spring.

In one embodiment, the central portion of the ortho-planar spring is secured to the housing and the outer portion of the ortho-planar spring is secured to the end plate.

In one embodiment, a boss at one end of the housing provides a hard stop for a portion of the ortho-planar spring.

BRIEF DESCRIPTION OF THE DRAWINGS

These and other features and advantages of the present invention will become appreciated as the same become better understood with reference to the specification, claims and appended drawings wherein:

FIG. 7A is a photograph of a buckling column assembly with an eccentric rocking member in the shape of a foot, in the buckled configuration according to an embodiment of the present invention;

FIG. 7B is a close-up photograph of the buckling column assembly of FIG. 7A, according to an embodiment of the present invention;

FIG. 7C is an enlarged schematic side view of the eccentric rocking member in the shape of a foot of the embodiment of FIG. 6A;

FIG. 14A is a perspective exploded view of a cylindrical assembly including a buckling column according to an embodiment of the present invention;

FIG. 14B is a perspective cutaway view of the embodiment of FIG. 14A; and

DETAILED DESCRIPTION

The detailed description set forth below in connection with the appended drawings is intended as a description of exemplary embodiments of a buckling column load switch spring provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
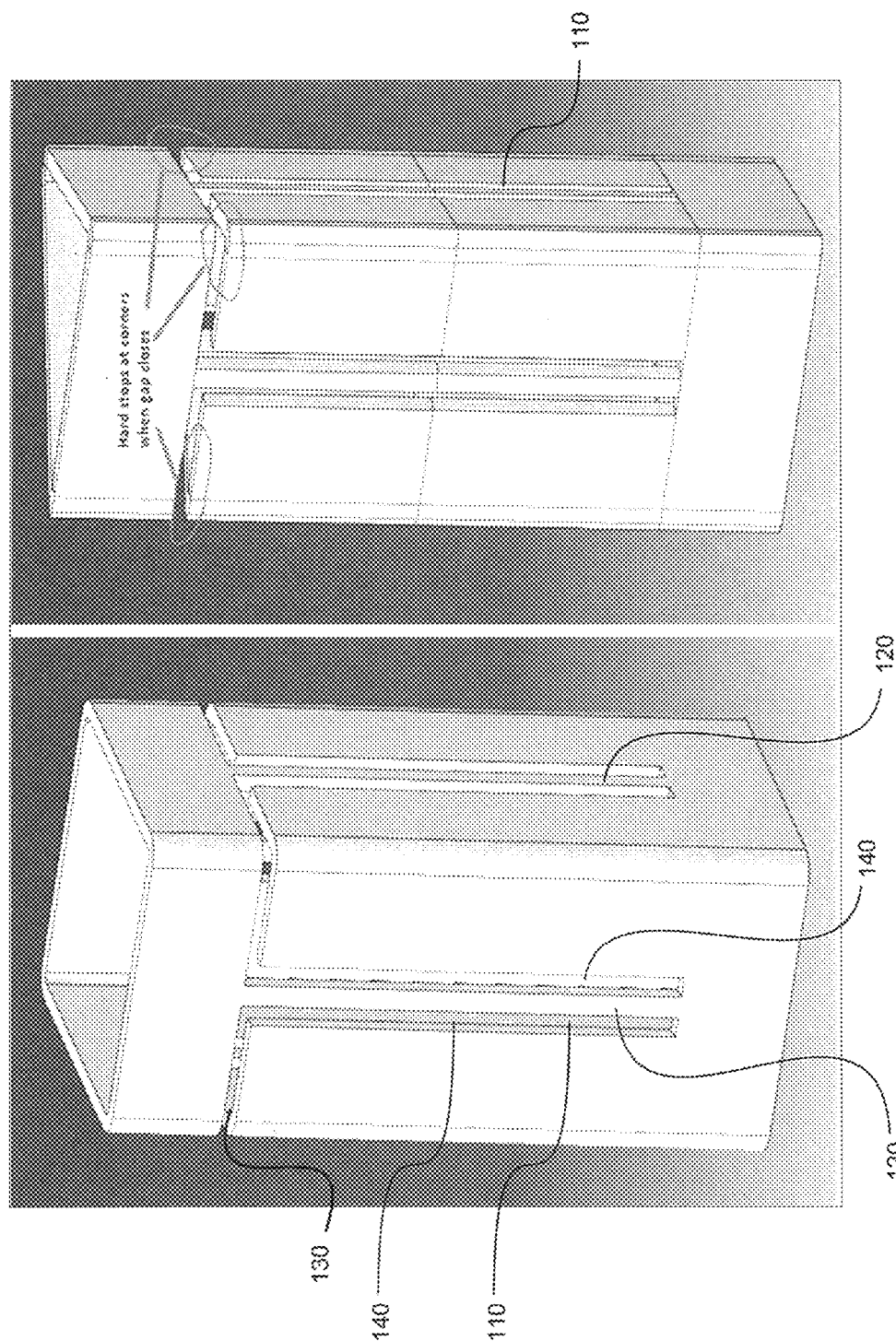
FIG. 1A is a tubular structure with buckling columns according to an embodiment of the present invention.
FIG. 1B is a tubular structure with buckling columns according to another embodiment of the present invention.

Referring to FIG. 1A and FIG. 1B, in one embodiment, a buckling column load switch spring is formed as a square or triangular tubular member with cutouts 110 in the walls of the tube defining one or more columns 120. The cutouts 110 form gaps including transverse gaps 130 and longitudinal gaps 140. The columns 120 are designed to buckle under applied compressive load and are therefore referred to herein, whether in a buckled or un-deformed state, as buckling columns 120. When a compressive force is applied to the tube and the compressive stress on a buckling column exceeds a critical load, the buckling column 120 becomes unstable and deforms laterally, assuming a curved shape. This buckling behavior may be referred to as Euler buckling. Laser machining or another precision machining technique may be used to match the critical loads of the buckling columns 120.

A tubular structure may have buckling columns 120 at several points about its circumference, and they may be symmetrically arranged, providing a symmetric loading condition to the buckling columns 120 when the tube is stressed in compression. The tube may be composed of a high-strength material such as 4130 chromoly steel, 17-4 stainless steel, Martinsitic stainless steel, super duplex stainless steel, maraging steel, such as C-300 maraging steel, or 1095 high strength spring steel, titanium alloys, Cu—Be alloys and other alloys with yield strains exceeding 0.5%. The cutouts 110 may be formed by, for example, conventional machining, e.g., milling, or by laser machining, electrical discharge machining (EDM), or water jet cutting.

Figure 2:
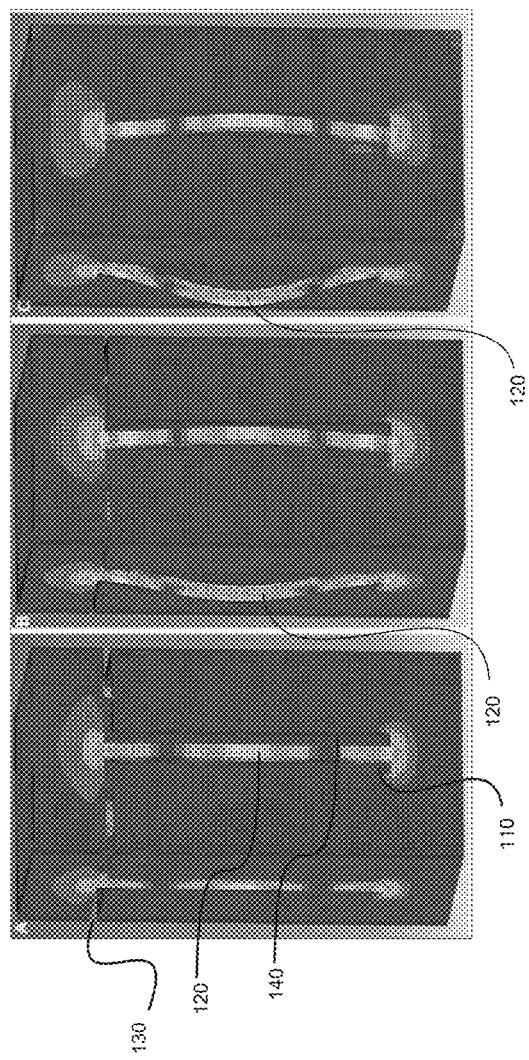
FIG. 2A is a graphical representation of the results of finite element analysis of the embodiment of FIG. 1A at a low level of deformation.
FIG. 2B is a graphical representation of the results of finite element analysis of the embodiment of FIG. 1A at a moderate level of deformation.
FIG. 2C is a graphical representation of the results of finite element analysis of the embodiment of FIG. 1A at a high level of deformation, with hard stops engaged.

Referring to FIG. 2A, FIG. 2B, and FIG. 2C, as the compressive load on the tube is increased, each buckling column 120 may deform progressively further outwards, so that the center section of the buckling column 120 protrudes from the local surface of the tube. At the point of maximum deformation, shown in FIG. 2C, the transverse gap 130 is closed at the corners of the tube, causing the load path to shift away from the buckling column 120. Thus the transverse gap 130 acts as an axial hard stop, preventing the load on the buckling column 120 from exceeding the load at which the transverse gap 130 is closed. Having hard stops in the corners provides extra axial, bending, and torsional rigidity.

Figure 3:
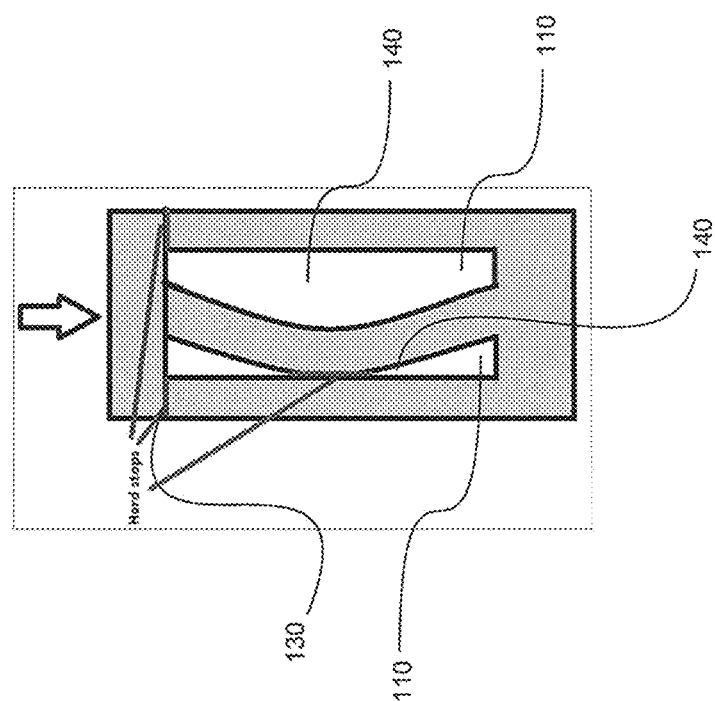
FIG. 3 is a schematic diagram of a structure with buckling columns at a high level of deformation, with axial hard stops and a lateral hard stop engaged, according to an embodiment of the present invention.

Referring to FIG. 3, in one embodiment the buckling column 120 may, instead of deforming outwards, deform in the plane of the tube, i.e., in a direction causing the width of one of the longitudinal gaps 140 to become smaller. At a certain compressive load, this longitudinal gap 140 may close entirely, and the center section of the buckling column 120 may contact the adjacent point in the wall of the tube. This results in the buckling column 120 being supported against further buckling. The longitudinal gap 140 thus acts as an additional hard stop, referred to as a lateral hard stop. The lateral hard stop may be reached before, or, in one embodiment, at substantially the same load, as the axial hard stops.

Figures 4A, 4B:
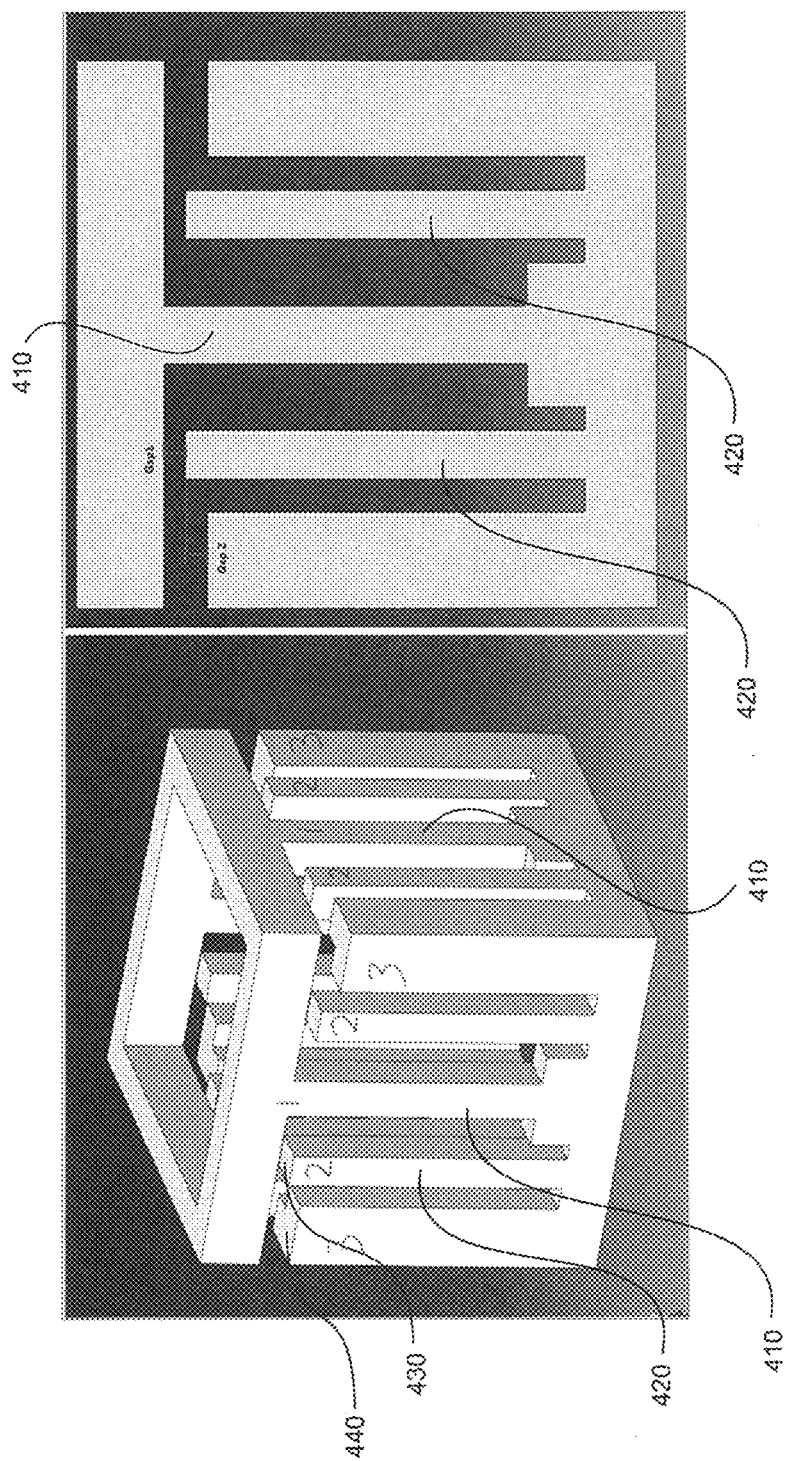
FIG. 4A is a perspective view of a tubular structure with buckling columns designed to engage at varying amounts of compressive displacement, according to an embodiment of the present invention.
FIG. 4B is a side cross-sectional view through a wall of the structure of FIG. 4A.
Figure 5:
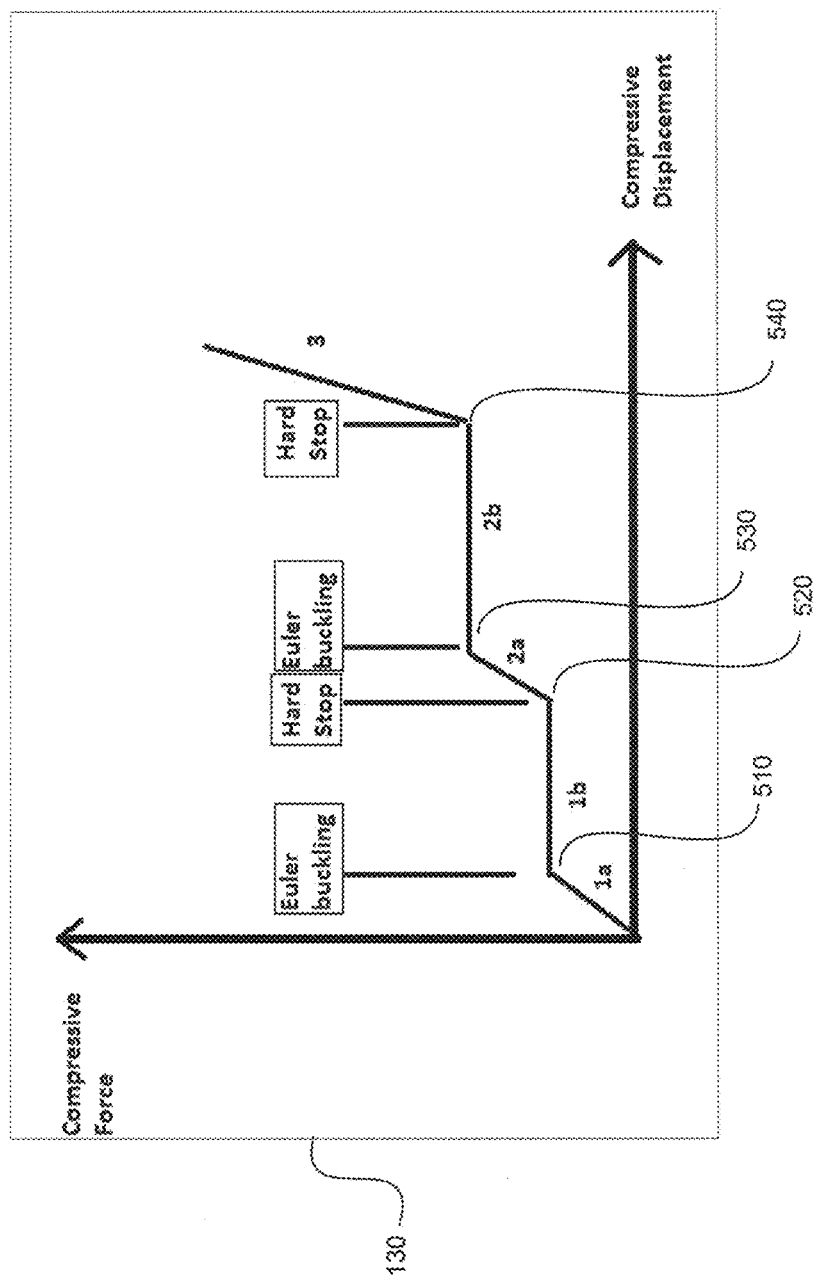
FIG. 5 is a schematic chart showing compressive force vs. compressive displacement for the embodiment of FIG. 4A.

Referring to FIG. 4A, FIG. 4B, and FIG. 5, in one embodiment a tube has cutouts 110 defining multiple buckling columns which buckle at different compressive displacements as the tube is loaded in compression. A first set of buckling columns 410 may initially bear the entire compressive load, resulting in high stiffness up to a first point 510 (FIG. 5), reached at a first threshold force, at which the first buckling columns 410 begin to buckle. As the first buckling columns 410 buckle, the compressive displacement increases without an increase in the compressive force, until at a point 520 a second set of buckling columns 420 is engaged as a result of the closing of a transverse gap 430 at the end of each of the buckling columns 420 in the second set. At this point the structure again becomes relatively stiff in compression until at a point 530, reached at a second threshold force, the columns 420 in the second set begin to buckle, and again the compressive displacement increases without an increase in the compressive force, until at a point 540 a set of transverse gaps 440 closes, engaging a corresponding set of axial hard stops. The number of beams, dimensions of the beams, and thickness and length of the tube all contribute to the stiffness of the structure. This allows the stiffness to be tuned to the application, making it possible to design a structure with specific and different stiffness at various displacement ranges.

Referring to FIG. 6A, FIG. 6B, FIG. 6C, FIG. 6D, FIG. 7A, FIG. 7B, and FIG. 7C, in one embodiment a buckling column 120 is provided with a foot 605, or eccentric rocking member, at each end. The heel 610 of each foot 605 is initially in contact with a respective loading surface 705 (FIG. 7B) which transmits, through the heel 610, a compressive force to the buckling column 120. The center of the heel 610 is offset from the centerline of the buckling column 120, so that the line of action of the force on the foot 605 from the loading surface 705 is offset from the action of the opposing force from the buckling column 120, and the two forces produce a torque or moment on the foot 605. This torque produces a bending moment in the buckling column 120 (FIG. 7C), causing it to buckle at a lower compressive strain than it would otherwise, and to buckle in a predictable and repeatable direction, e.g., in the direction dictated by the torque on the two feet 605. As the buckling column 120 buckles, the foot 605 rotates until the angled surface 620 of the toe 615 comes into contact with the loading surface 705, as shown in FIG. 7A and FIG. 7B. The force of the loading surface 705 on the toe 615 of each foot 605 produces a torque on the foot 605 tending to oppose continued buckling and in this manner the toe 615 acts as a rotational stop. The ability of each foot 605 to rock from the heel 610 to the toe 615 forms a tilting mechanism which provides kinematic boundary conditions at the ends of the buckling column 120 which, relative to fixed boundary conditions, reduce the peak strains at the ends of the buckling column 120. Buckling columns 120 fabricated according to these embodiments may be substituted for those of the embodiment of FIG. 1, by installing them between the upper and lower tube ends, and maintaining a compressive preload, e.g., with a spring, sufficient to hold the buckling columns 120 in place.

Figures 6A, 6B, 6C, 6D:
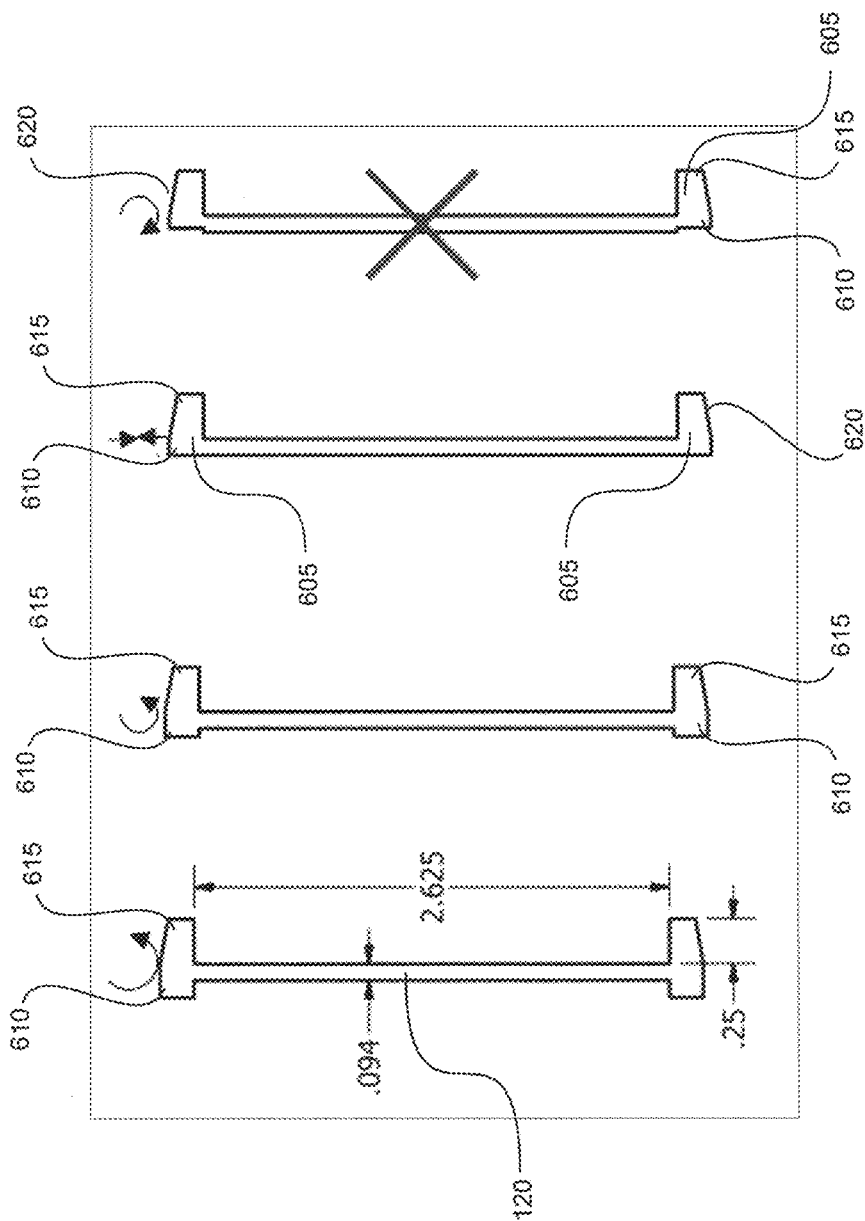
FIG. 6A is a schematic side view of a buckling column assembly with an eccentric rocking member in the shape of a foot at each end according to an embodiment of the present invention.
FIG. 6B is a schematic side view of a buckling column assembly with an eccentric rocking member in the shape of a foot at each end according to another embodiment of the present invention.
FIG. 6C is a schematic side view of a buckling column assembly with an eccentric rocking member in the shape of a foot at each end according to another embodiment of the present invention.
FIG. 6D is a schematic side view of a buckling column assembly with an eccentric rocking member in the shape of a foot at each end according to another embodiment of the present invention.
Figure 8:
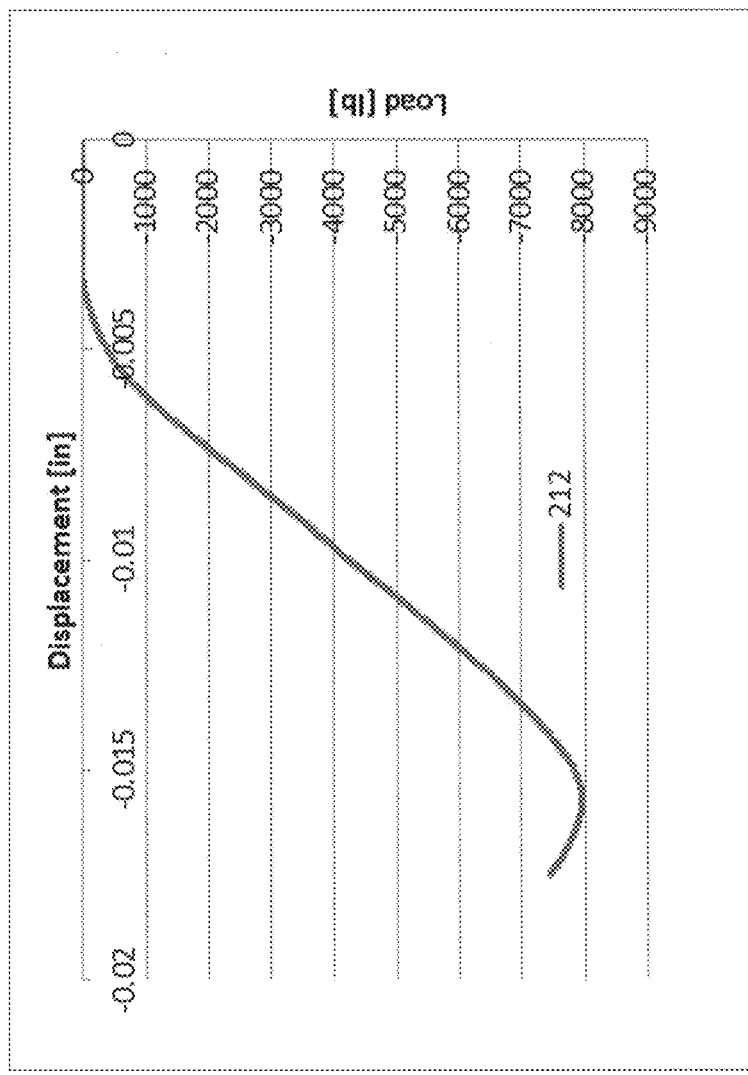
FIG. 8 is a chart showing results of a compression test of a buckling column assembly constructed according to the embodiment of FIG. 7A.

Referring to FIGS. 6B, 6C, and 6D, shortening the heel 610 of each foot 605 results in a shift in the line of action of the force from the loading surface 705, and a resulting reduction in the moment. If the heel 610 is sufficiently shortened, as in FIG. 6D, the torque on the foot 605 may be such that the buckling column 120 buckles in a direction in which the toe 615 moves away from, not towards, the loading surface 705, and the toe 615 will not act as a rotational stop. In one embodiment, the length and thickness of the buckling column 120 are 2.625 inches and 0.094 inches respectively, and the length of the toe 615 is 0.25 inch, as shown in FIG. 6A. FIG. 8 shows results of a compression test of a buckling column assembly constructed according to the embodiment shown in FIGS. 7A and 7B.

Figure 9:
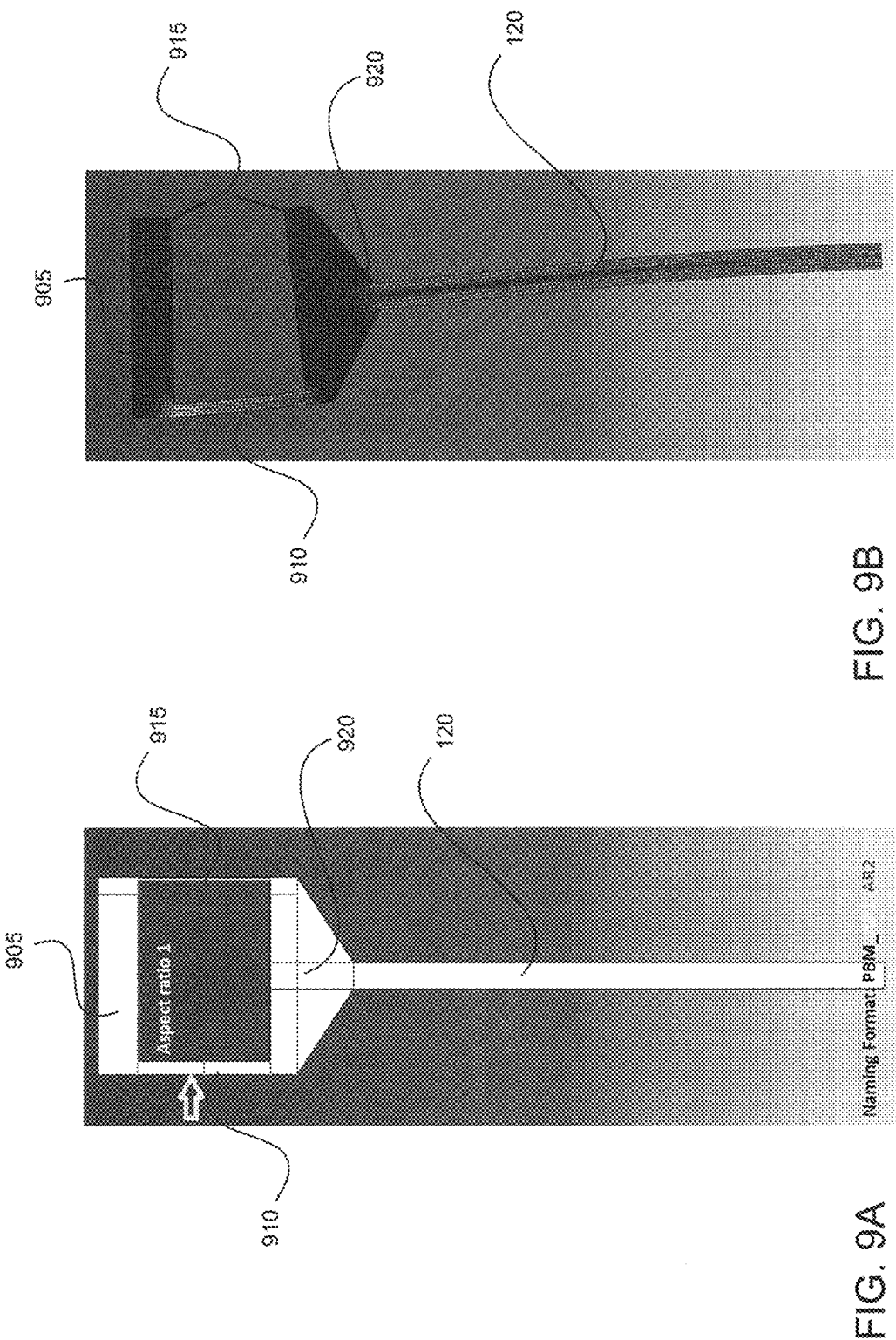
FIG. 9A is a side view of a composite element including a buckling column according to an embodiment of the present invention.
FIG. 9B is a graphical representation of the results of finite element analysis of the embodiment of FIG. 9A.

Referring to FIG. 9A, and FIG. 9B, in one embodiment a composite element includes a first transverse beam 905 in the form of a rectangular member, a bending element 910, a mono-stable element 915, a second transverse beam 920 in the form of a triangular member, and a buckling column 120. The mono-stable element 915 has a nonlinear mechanical impedance causing it to have high stiffness up to a threshold compressive load, and low compressive stiffness for compressive load exceeding the threshold load. The mono-stable element 915 may, for example, include a flexible domed structure such as is used in buttons on some consumer devices such as mobile phones with mechanical buttons. The domed structure exhibits high stiffness in response to a compressive force as long as the force is sufficiently small that the dome remains essentially undistorted, and compressive force is transmitted as a compressive force through the wall of the dome. When the force is sufficiently large to produce a significant deformation of the dome, the load is transmitted through bending of the dome wall. Because the dome wall is more readily bent than compressed, the compressive stiffness of the dome decreases abruptly at this point.

The assembly composed of the first transverse beam 905, the bending element 910, the mono-stable element 915, and the second transverse beam 920 forms a dual load path element which operates as a tilting mechanism. If the bending element 910 and the mono-stable element 915 are approximately the same distance from the centerline of the assembly, e.g., from the centerline of the buckling column 120, then at low loads, for which the mono-stable element 915 has high stiffness, the load through the composite element is carried in approximately equal parts by the bending element 910 and the mono-stable element 915, being distributed onto these two elements by the first transverse beam 905 and the second transverse beam 920. Once the mono-stable element 915 becomes less stiff, the compressive force through the composite element is carried in greater proportion by the bending element 910 than by the mono-stable element 915, resulting in a moment or torque on the second transverse beam 920, which transmits this torque as a bending moment to the buckling beam. This torque may be sufficient to cause the buckling column 120 to bend significantly, causing a significant reduction in stiffness.

The boundary conditions between a load-carrying member, e.g., a shaft applying a compressive load to the composite element, and the first transverse beam 905, may be fixed, and the assembly consisting of the first transverse beam 905, the bending element 910, the mono-stable element 915, and the second transverse beam 920 provides a switching function, triggering buckling of the buckling column 120 and allowing the end of the buckling column 120 connected to the second transverse beam 920 to tilt.

Figure 10:
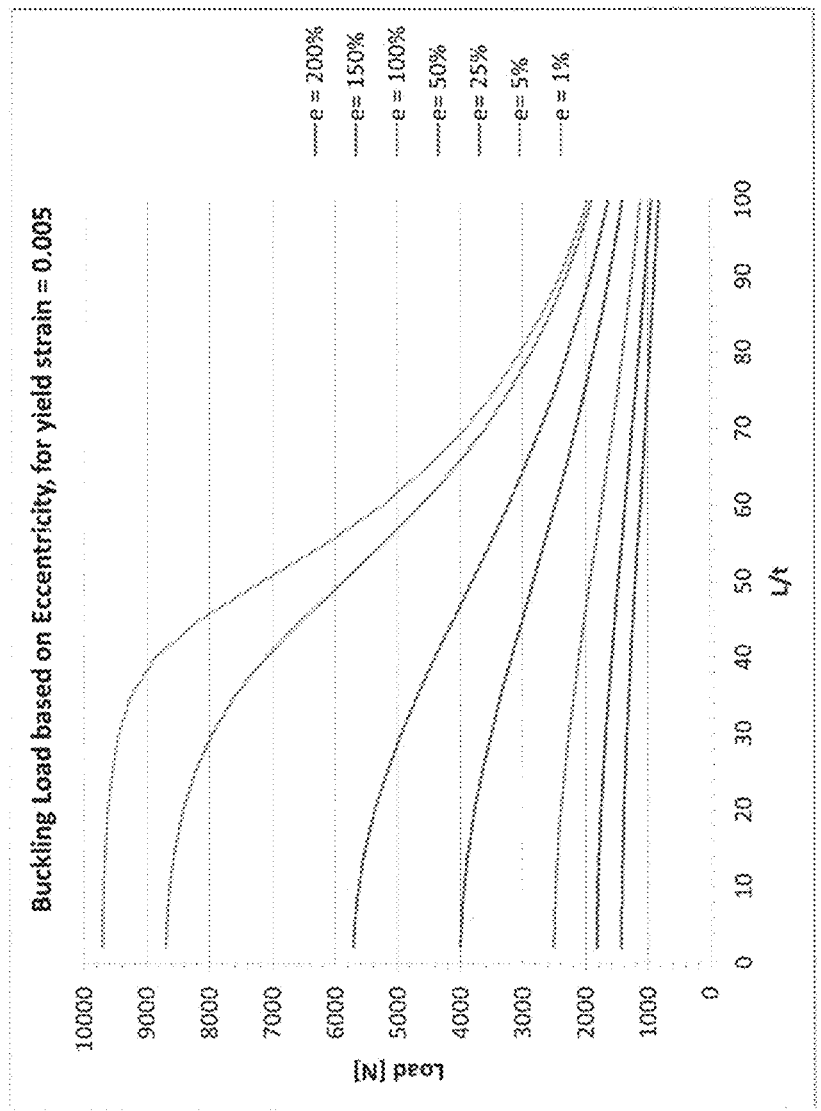
FIG. 10 is a chart showing results of finite element analysis of the embodiment of FIG. 9A.

In addition to the threshold load of the mono-stable element 915, the position of the bending element 910 may be selected to adjust the behavior of the composite element. For example, increasing the eccentricity of the assembly, where the eccentricity is defined as twice the ratio of the offset from center of the bending element 910 to the thickness of the buckling column 120, causes the column to buckle more easily. FIG. 10 shows a chart of buckling load vs. the aspect ratio, i.e. the ratio of length to thickness, of the buckling column 120, for eccentricities ranging from 1% to 200%. In one embodiment the aspect ratio of the buckling column 120 is 40, and the composite element is formed by conventional machining, e.g., milling.

Figure 11:
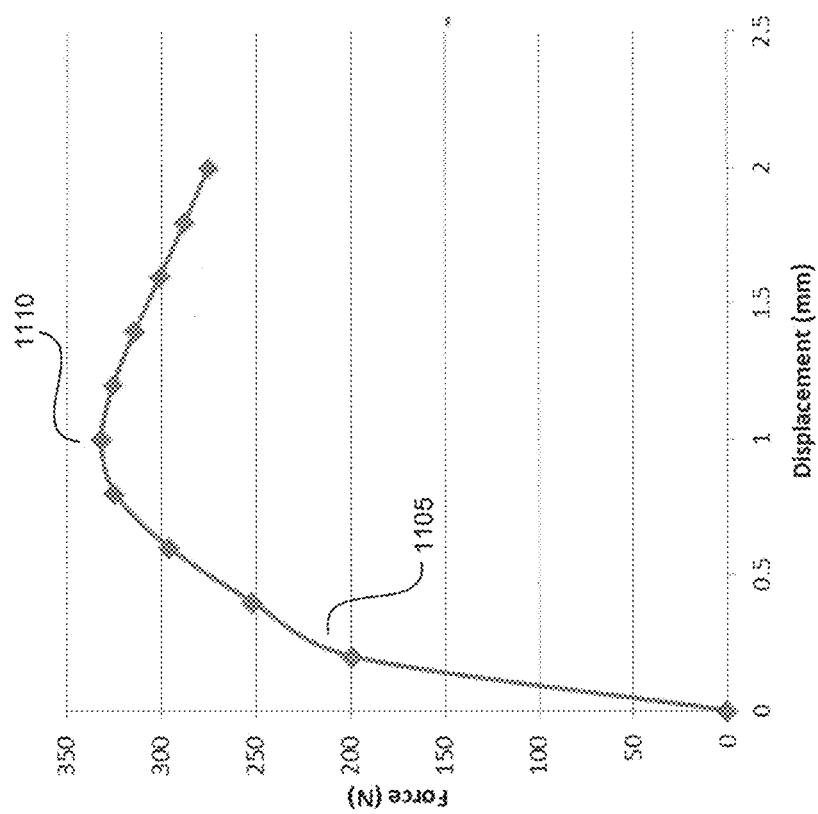
FIG. 11 is an exemplary chart of force vs. displacement for the embodiment of FIG. 9A.

Various stiffness curves may be achieved with the embodiment of FIG. 9A, and FIG. 9B. For example, referring to FIG. 11, for a suitably selected mono-stable element 915, eccentricity, bending element 910, and buckling column 120, the stiffness at low displacement may be high, and it may decrease abruptly at a first break point 1105 corresponding to the compressive force on the mono-stable element 915 exceeding the threshold load. The stiffness may then decrease further at a second break point 1110 corresponding to buckling of the buckling column 120.

Figure 12:
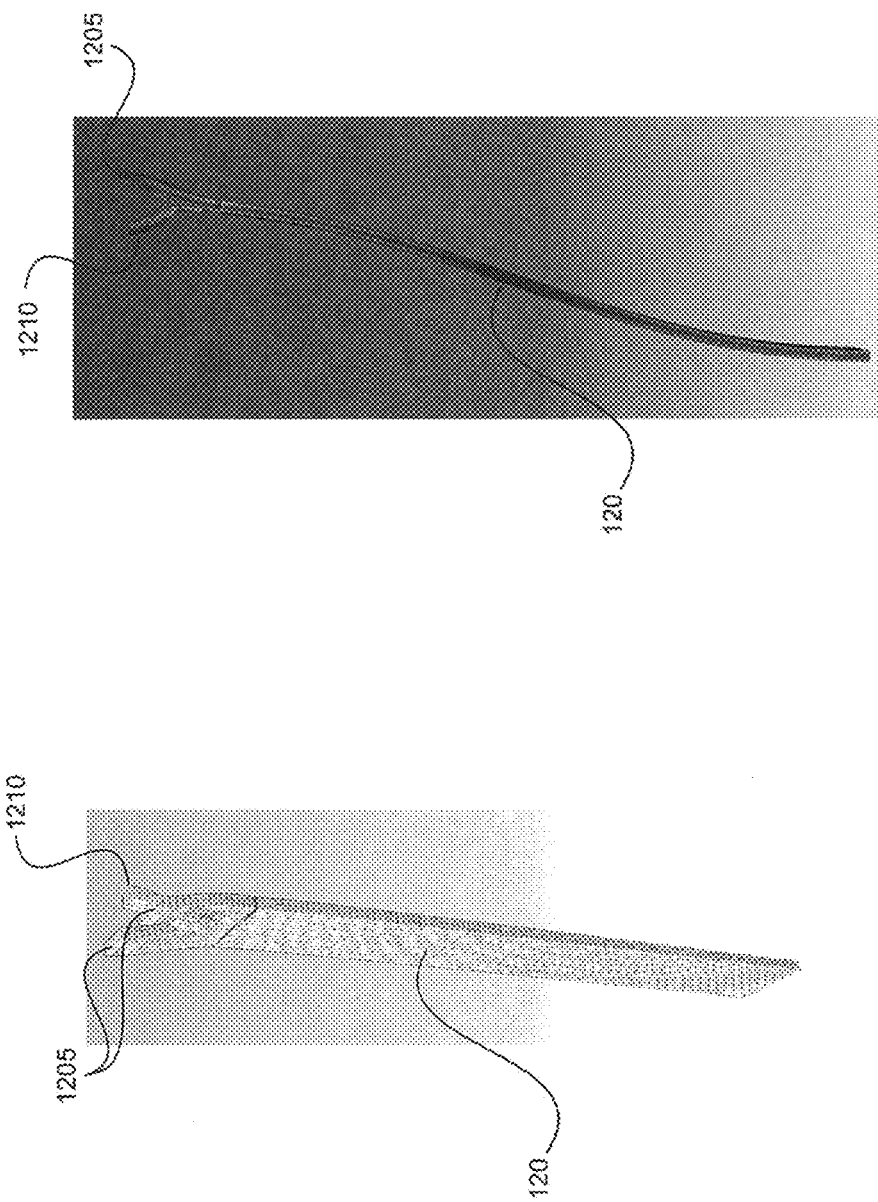
FIG. 12A is a perspective view of a buckling column element with a forked end according to an embodiment of the present invention.
FIG. 12B is a graphical representation of the results of finite element analysis of the embodiment of FIG. 12A.
Figure 13:
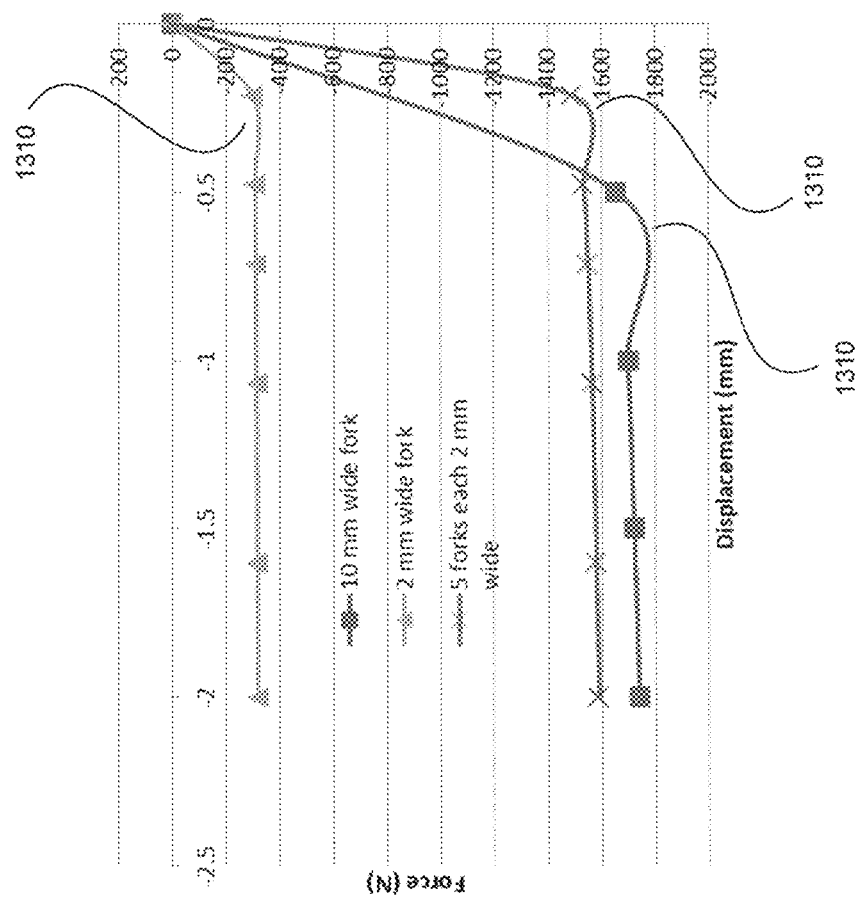
FIG. 13 is an exemplary chart of force vs. displacement for the embodiment of FIG. 12A.

Referring to FIG. 12A and FIG. 12B, in one embodiment a buckling column 120 is formed in the shape of a leaf or blade with one end cut to form a three-tined fork, with the two outer tines 1205 extending out of the plane of the blade and the central tine 1210 being shorter than the outer tines 1205 and extending out of the plane of the blade, to a greater extent, and in the opposite direction. A rectangular load carrying shaft suitably welded or bolted to the tines of the fork may impart a torque or moment to the forked end of the buckling column 120, affecting its buckling behavior. In one embodiment the aspect ratio, i.e., the ratio of length to thickness, of the buckling column 120 is between 40 and 80, and the ratio of width to thickness is between 2 and 5. Referring to FIG. 13, finite element analysis shows an abrupt transition 1310 for this embodiment, between an high stiffness state, and a low-stiffness buckled state.

Referring to FIG. 14A and FIG. 14B, in one embodiment an assembly with nonlinear mechanical impedance includes a buckling column 120, a cylindrical housing 1610, two caps 1620, each threaded onto the cylindrical housing 1610 and secured with locknuts 1630, and two end plates 1640. Each end plate 1640 has a nub at the center of the surface facing the buckling column 120, which has an indentation to accommodate the nub, so that the nub maintains the transverse registration of the end plate 1640 and the buckling column 120. Circular flexures 1650 at each end of the assembly constrain the end plates 1640 to move only longitudinally with respect to the cylindrical housing 1610 and caps 1620. The outer portions of the flexures 1650 are secured to the end caps with bolts 1660 and the central portions of the flexures 1650 are secured to the caps 1620 with nuts 1670. Each nut 1670 threads onto a corresponding threaded hollow cylindrical portion 1680 of a cap 1620. In operation, a compressive load applied to the end plates 1640 is transmitted through the buckling column 120, which buckles when the critical load is reached. The inner wall of the cylindrical housing 1610 may act as a lateral hard stop for the buckling column 120, or a boss, or raised portion 1690, on each end cap may act as an axial hard stop by making contact with the outer portion of the adjacent flexure 1650. The flexures 1650 may also act as springs.

Figure 15:
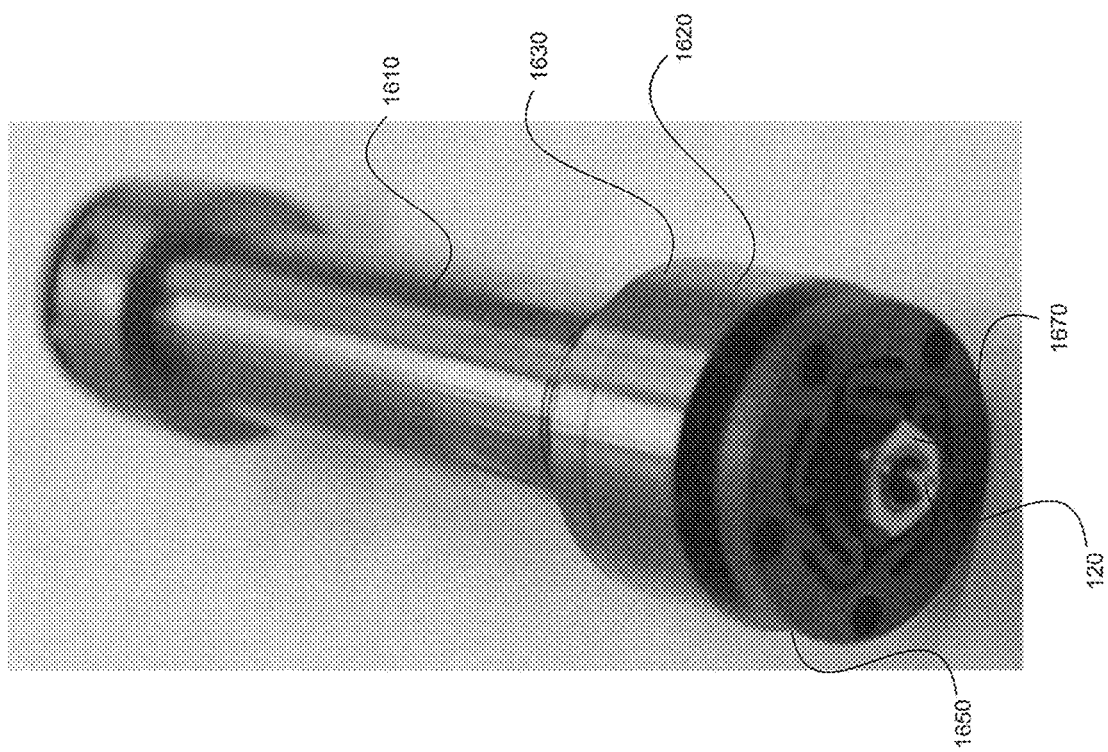
FIG. 15 is a photograph of a subassembly of the embodiment of FIG. 14A.

FIG. 15 is a photograph of a prototype of the embodiment of FIG. 14A and FIG. 14B, with the end plates 1640 removed, exposing, at one and of the assembly, the flexures 1650, the nut 1670, and one end of the buckling column 120. In one embodiment the flexures may be formed of sheet metal with a solid outer portion and a solid central portion, and with cuts made by laser machining or EDM to leave flexible serpentine spokes connecting the outer portion and the central portion. Such an assembly may be referred to as an ortho-planar spring.

Mechanical elements including buckling columns 120 may be combined with other elements such as dashpots, so that, for example, if a support member including a buckling column 120, and a dashpot, secured together in parallel, is subjected to a large load, the buckling column 120 may buckle, causing the load path to shift to the dashpot, in which energy dissipates until the compressive displacement of the assembly causes hard stops to engage.

Although limited embodiments of a buckling column load switch spring have been specifically described and illustrated herein, many modifications and variations will be apparent to those skilled in the art. Accordingly, it is to be understood that a buckling column load switch spring constructed according to principles of this invention may be embodied other than as specifically described herein. The invention is also defined in the following claims, and equivalents thereof.

What is claimed is:

1. A monolithic nonlinear mechanical element, comprising:
    a substantially flat buckling column extending in a first direction from a first end to a second end of the flat buckling column, and an integral foot, extending substantially in a second direction perpendicular to the first direction, at each of the first and second ends,
    each foot having:
        a heel; and
        a toe having an angled surface,
    the heel of each foot being configured to cause the buckling column to buckle in the second direction when the monolithic nonlinear mechanical element is subjected to a compressive force transmitted to the nonlinear mechanical element by two parallel surfaces substantially perpendicular to the first direction, and
    the angled surface of the toe of each foot being configured to protect the buckling column from buckling beyond its elastic limit.

2. A monolithic nonlinear mechanical element, comprising a substantially flat buckling column extruding in a first direction and having two ends, and an integral foot, extending substantially in a second direction perpendicular to the first direction, at each of the two ends,
    each foot having:
        a heel; and
        a toe having an angled surface,
    the heel being configured to cause the buckling column to buckle in the second direction when the monolithic nonlinear mechanical element is subjected to a compressive force transmitted to the nonlinear mechanical element by two parallel surfaces substantially perpendicular to the first direction, and the angled surface of the toe of each foot being configured to protect the buckling column from buckling beyond its elastic limit by coming into contact with one of the two parallel surfaces.

3. A monolithic nonlinear mechanical element, comprising a substantially flat buckling column extending in a first direction and having two ends, and an integral foot, extending substantially in a second direction perpendicular to the first direction, at each of the two ends, each foot having:
a heel; and
a toe having an angled surface, the heel being configured to cause the buckling column to buckle in the second direction when the monolithic nonlinear mechanical element is subjected to a compressive force transmitted to the nonlinear mechanical element by two parallel surfaces substantially perpendicular to the first direction, the angled surface of the toe being configured to protect the buckling column from buckling beyond its elastic limit, wherein a first heel of the two heels is in contact with a flat portion of one of the two parallel surfaces.

4. A monolithic nonlinear mechanical element, comprising a substantially flat buckling column extending in a first direction and having two ends, and an integral foot, extending substantially in a second direction perpendicular to the first direction, at each of the two ends, each foot having:
a heel; and
a toe having an angled surface, the heel of each foot being configured to cause the buckling column to buckle in the second direction when the monolithic nonlinear mechanical element is subjected to a compressive force transmitted to the nonlinear mechanical element directly by two parallel surfaces substantially perpendicular to the first direction, and the angled surface of the toe being configured to protect the buckling column from buckling beyond its elastic limit.

* * * * *